(12) United States Patent
Shimura (10) Patent No.: US 8,850,884 B2
(45) Date of Patent: Oct. 7, 2014

(54) LIQUID TANK AND FUEL CELL

(75) Inventor: Jusuke Shimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 13/382,259

(22) PCT Filed: Jul. 2, 2010

(86) PCT No.: PCT/JP2010/061313
§ 371 (c)(1),
(2), (4) Date: Jan. 4, 2012

(87) PCT Pub. No.: WO2011/004765
PCT Pub. Date: Jan. 13, 2011

(65) Prior Publication Data
US 2012/0111107 A1 May 10, 2012

(30) Foreign Application Priority Data
Jul. 10, 2009 (JP) .................................. 2009-164048

(51) Int. Cl.
*G01F 23/26* (2006.01)
*H01M 8/04* (2006.01)

(52) U.S. Cl.
CPC ......... *H01M 8/04216* (2013.01); *G01F 23/263* (2013.01); *G01F 23/268* (2013.01); *H01M 8/04313* (2013.01); *H01M 8/0438* (2013.01); *Y02E 60/50* (2013.01)
USPC ..... 73/304 C; 73/290 R; 73/290 B; 73/290 V; 73/304 R (58) Field of Classification Search
USPC ............. 73/290 B, 290 R, 290 V, 291, 304 R, 73/304 C
See application file for complete search history.

(56) References Cited

U.S. PATENT DOCUMENTS

| | | | | |
|---|---|---|---|---|
| 3,343,415 A * | 9/1967 | Johnston | ...................... | 73/304 C |
| 3,665,209 A * | 5/1972 | Webb et al. | ................... | 307/118 |
| 3,939,360 A * | 2/1976 | Jackson | ........................ | 307/118 |
| 4,002,996 A * | 1/1977 | Klebanoff et al. | .............. | 331/65 |
| 4,201,085 A * | 5/1980 | Larson | ........................ | 73/304 C |
| 4,382,382 A * | 5/1983 | Wang | .......................... | 73/304 R |
| 4,603,581 A * | 8/1986 | Yamanoue et al. | ......... | 73/304 C |
| 4,757,252 A * | 7/1988 | Maltby et al. | ................. | 324/687 |

(Continued)

FOREIGN PATENT DOCUMENTS

| | | |
|---|---|---|
| JP | 06-12283 | 1/1994 |
| JP | 3139931 | 3/2001 |

(Continued)

*Primary Examiner* — David A Rogers
(74) *Attorney, Agent, or Firm* — K&L Gates LLP (57) ABSTRACT

Provided are a liquid tank capable of reducing an influence of disturbance on measurement results and measuring accurate volume, and a fuel cell using the same. One face of a liquid container section is structured by a detector in which a first board to a fourth board each configured of a printed board are stacked in order. A pair of detection electrodes 12A and 12B are provided on a front face of the first board, and this pair of detection electrodes 12A and 12B are allowed to contact directly or indirectly to a liquid fuel inside the liquid container section to detect a stray capacitance. A back face side of the first board is disposed with the second board having a shielding electrode 22. Even when a hand or the like is brought close to the detector, the detection electrodes 12A and 12B are prevented from sensing the stray capacitance generated as a result.

10 Claims, 10 Drawing Sheets

(56) References Cited

U.S. PATENT DOCUMENTS

| | | | | |
|---|---|---|---|---|
| 4,890,490 | A * | 1/1990 | Telford | 73/290 V |
| 5,005,407 | A * | 4/1991 | Koon | 73/290 R |
| 5,005,409 | A * | 4/1991 | Hochstein | 73/304 C |
| 5,051,921 | A * | 9/1991 | Paglione | 702/52 |
| 5,406,843 | A * | 4/1995 | Hannan et al. | 73/304 C |
| 5,765,434 | A * | 6/1998 | Harbaugh | 73/304 C |
| 6,269,694 | B2 * | 8/2001 | Morimoto | 73/305 |
| 6,490,920 | B1 * | 12/2002 | Netzer | 73/304 C |
| 6,539,797 | B2 * | 4/2003 | Livingston et al. | 73/304 C |
| 6,641,240 | B2 * | 11/2003 | Hsu et al. | 347/7 |
| 6,761,067 | B1 * | 7/2004 | Capano | 73/304 C |
| 6,842,018 | B2 * | 1/2005 | McIntosh | 324/664 |
| 6,962,078 | B2 * | 11/2005 | Angal et al. | 73/290 V |
| 7,161,361 | B2 * | 1/2007 | Qu et al. | 324/690 |
| 7,258,005 | B2 * | 8/2007 | Nyce | 73/304 C |
| 7,533,566 | B2 * | 5/2009 | Tung et al. | 73/290 B |
| 7,661,307 | B1 * | 2/2010 | Milone | 73/304 R |
| 7,698,936 | B2 * | 4/2010 | Curello et al. | 73/149 |
| 7,798,586 | B2 * | 9/2010 | Watanabe | 347/7 |
| 8,047,073 | B2 * | 11/2011 | Zabel et al. | 73/304 C |
| 8,088,521 | B2 * | 1/2012 | Ju et al. | 429/428 |
| 8,474,314 | B2 * | 7/2013 | Neuburger et al. | 73/290 R |
| 8,549,764 | B2 * | 10/2013 | Muyskens et al. | 33/366.19 |
| 8,549,910 | B2 * | 10/2013 | McGaughey et al. | 73/304 C |
| 8,587,329 | B2 * | 11/2013 | Winkens | 324/679 |
| 8,635,908 | B2 * | 1/2014 | Muyskens et al. | 73/304 C |
| 2001/0000851 | A1 * | 5/2001 | Morimoto | 73/304 C |
| 2002/0083767 | A1 * | 7/2002 | Kemp | 73/292 |
| 2002/0194910 | A1 * | 12/2002 | Schelhas et al. | 73/290 R |
| 2002/0197522 | A1 * | 12/2002 | Lawrence et al. | 429/34 |
| 2003/0213960 | A1 * | 11/2003 | Kitagawa et al. | 257/71 |
| 2005/0072228 | A1 * | 4/2005 | Jakoby et al. | 73/304 C |
| 2005/0076711 | A1 * | 4/2005 | Urquidi | 73/304 C |
| 2005/0229700 | A1 * | 10/2005 | Chai et al. | 73/304 R |
| 2006/0042376 | A1 * | 3/2006 | Reusche et al. | 73/304 C |
| 2007/0157718 | A1 * | 7/2007 | Woodard et al. | 73/149 |
| 2007/0204690 | A1 * | 9/2007 | Salzmann et al. | 73/304 R |
| 2008/0003473 | A1 * | 1/2008 | Tung et al. | 429/26 |
| 2008/0053202 | A1 * | 3/2008 | Rohklin et al. | 73/61.41 |
| 2008/0134779 | A1 * | 6/2008 | Tung et al. | 73/304 C |
| 2008/0156801 | A1 * | 7/2008 | Tung et al. | 220/200 |
| 2008/0184795 | A1 * | 8/2008 | Woodard | 73/304 C |
| 2009/0158841 | A1 * | 6/2009 | Winkens | 73/304 C |
| 2011/0113878 | A1 * | 5/2011 | Ohshima et al. | 73/304 C |
| 2011/0120219 | A1 * | 5/2011 | Barlesi et al. | 73/304 C |
| 2011/0314907 | A1 * | 12/2011 | Wiedekind-Klein | 73/304 C |
| 2012/0240675 | A1 * | 9/2012 | Farmanyan | 73/304 C |
| 2012/0298157 | A1 * | 11/2012 | Noh et al. | 134/57 R |

FOREIGN PATENT DOCUMENTS

| | | |
|---|---|---|
| JP | 2005-351688 | 12/2005 |
| JP | 2006-40836 | 2/2006 |
| JP | 2007-305376 | 11/2007 |

* cited by examiner

LIQUID TANK AND FUEL CELL

CROSS REFERENCE TO RELATED APPLICATIONS

The present application is a national stage of International Application No. PCT/JP2010/061313 filed on Jul. 2, 2010 and claims priority to Japanese Patent Application No. 2009-164048 filed on Jul. 10, 2009, the disclosures of which are incorporated herein by reference.

BACKGROUND

The present invention relates to a liquid tank to contain liquid fuel or the like for a fuel cell, and a fuel cell provided therewith.

Usually, a fuel cell system, which uses liquid fuel such as methanol or a hydrogen generation auxiliary agent such as water, is internally equipped with a tank to store liquid. In the fuel cell system, in order to estimate a remaining time available for a device connected thereto, it is imperative that a remaining amount of liquid in the tank be accurately detected.

One method available for estimating the remaining liquid amount in the tank, as far as an active fuel cell in which fuel is actively sent in liquid form by use of a pump or the like is concerned, is to count the total number of times the pump has been driven. The fuel in the tank is found by a formula V1−V2×n, where V1 is the inner volume of the tank, V2 is a volume sent in liquid form per one time the pump is driven, and n is the total number of times the pump has been driven.

This method, however, is not applicable to a case where the tank is an exchangeable cartridge, and not applicable inherently to a passive fuel cell which does not use a pump. Further, even in a case of an active fuel cell, this method has a drawback in that an inaccurate result is likely to be produced due to accumulation of measurement errors, unless the volume V2 sent in liquid form per one time the pump is driven is extremely accurate. Methanol used as fuel for DMFCs varies in viscosity depending on the temperature. Therefore, it is difficult to keep the volume V2, sent in liquid form per one time the pump is driven, constant at all times. That is, it has been virtually difficult to know the accurate remaining amount by use of this method.

As another method available for checking the remaining amount of liquid in a tank, for example, Patent Document 1 proposes to provide two parallel plate electrodes in a fuel tank to thereby detect the remaining amount by using capacitance. Additionally, Patent Document 2 proposes a method of finding the liquid volume, in which comb-shaped electrodes opposed to each other are patterned on a printed board to detect a stray capacitance generated between interconnections.

PRIOR ART DOCUMENT

Summary

Patent Document 1: Japanese Unexamined Patent Application Publication No. 2006-40836 Gazette
Patent Document 2: Japanese Unexamined Patent Application Publication No. 2005-351688 Gazette

SUMMARY OF THE INVENTION

In order to obtain a sufficient detection sensitivity in the method of Patent Document 1, however, it is necessary to shorten a distance between the plate electrodes. For this reason, a water level changes due to surface tension, whereby this method has an issue in that it is not possible to measure accurate volume. Additionally, the method of Patent Document 2 has an issue in that, since detection sensitivities are provided for both sides of the printed board, a detection result changes when a hand or the like is brought close thereto.

The present invention has been made in consideration of the above described issues, and an object thereof is to provide a liquid tank capable of reducing an influence of disturbance on measurement results and measuring accurate volume, and a fuel cell using the same.

A liquid tank according to an embodiment of the present invention includes: a liquid container section storing liquid; and a detector detecting volume of the liquid stored in the liquid container section. The detector includes Elements (A) and (B) as described below:
(A) A first board having, on a front face thereof, a pair of detection electrodes for detecting a stray capacitance, in which the pair of detection electrodes directly or indirectly contact with the liquid inside the liquid container section.
(B) A second board having a shielding electrode and arranged on a back face side of the first board.

A fuel cell according to an embodiment of the present invention has a fuel cell main body, and a fuel cartridge which includes a liquid tank. The liquid tank is structured by the liquid tank described above.

In the liquid tank according to the embodiment of the present invention, the pair of detection electrodes, provided on the front face of the first board of the detector, directly or indirectly contact with the liquid inside the liquid container section, whereby the stray capacitance generated between the detection electrodes is detected. The second board having the shielding electrode is arranged on the back face side of the first board, whereby, even when a hand or the like is brought close to the detector, the detection electrodes are prevented from sensing a stray capacitance generated as a result.

The fuel cell according to the embodiment of the present invention includes the liquid tank mentioned above, whereby measurement results for the volume of the liquid are improved in accuracy. Therefore, it is possible to inform a user of a more accurate available remaining time, thereby improving convenience.

The liquid tank according to the embodiment of the present invention is provided with the pair of detection electrodes on the front face of the first board of the detector, and allows the pair of detection electrodes to contact directly or indirectly with the liquid inside the liquid container section to detect the stray capacitance, while the second board having the shielding electrode is arranged on the back face side of the first board. This makes it possible to reduce an influence of disturbance on measurement results, and to measure the accurate volume. Therefore, configuring the fuel cell by using this liquid tank makes it possible to estimate an available remaining time based on the accurate volume of the liquid fuel. In particular, it is suitable for fuel cells to be mounted to electronic devices intended for portable use, making it possible to improve the convenience of devices.

Additional features and advantages of the present invention are described in, and will be apparent from, the following Detailed Description and the Figures.

DETAILED DESCRIPTION

An embodiment of the present invention is described below in detail with reference to the drawings.

Figure 1:
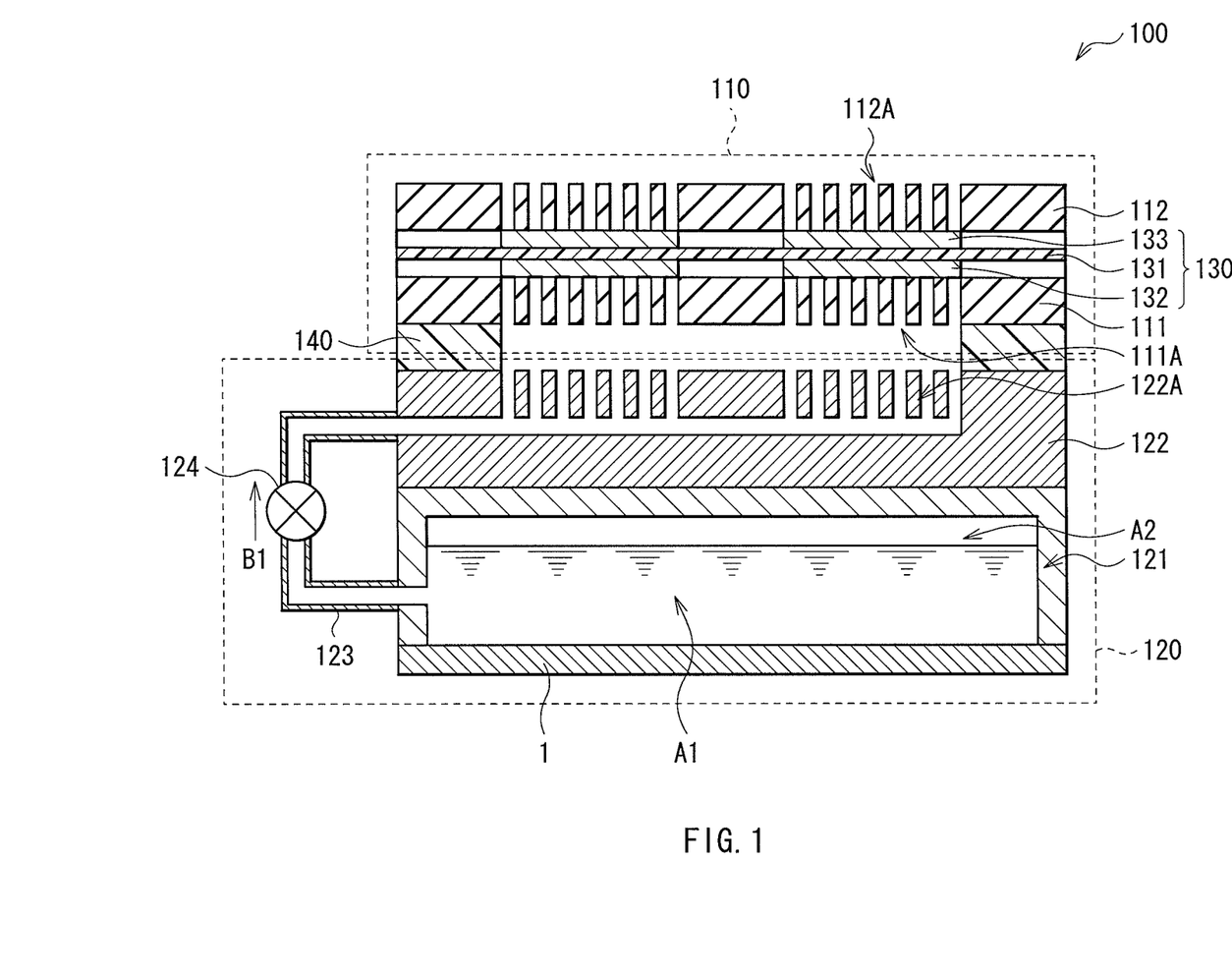
FIG. 1 is a cross-sectional view showing a schematic configuration of a fuel cell according to an embodiment of the present invention.

FIG. 1 shows a cross-sectional configuration of a fuel cell according to an embodiment of the present invention. This fuel cell 100 is a direct methanol fuel cell (DMFC: Direct Methanol Fuel Cell) in which liquid fuel which is, for example, methanol is directly supplied and reacted, and is used in an electronic device such as a mobile phone and a notebook PC (Personal Computer). The fuel cell 100 has, for example, a fuel cell main body 110 and a fuel cartridge 120. The fuel cartridge 120 corresponds to one specific example of a "fuel tank" of the present invention.

The fuel cell main body 110 has a plurality of joined bodies 130. Each of the joined bodies 130 has a structure in which an anode electrode (fuel electrode) 132 and a cathode electrode (oxygen electrode) 133 are arranged so as to be opposed to each other with an electrolyte membrane 131 interposed therebetween. These joined bodies 130 are sandwiched between an anode-side plate-like member 111 and a cathode-side plate-like member 112, and sealed, for example, by a gasket (unillustrated). Note that, although the electrolyte membrane 131 serves as a layer which is common among the plurality of joined bodies 130 in FIG. 1, it may be provided for each of the joined bodies 130.

The electrolyte membrane 131 is structured by, for example, a proton-conducting material having a sulfonic acid radical ($-SO_3H$). Examples of the proton-conducting material include: a poly perfluoro alkyl sulfonic acid based proton-conducting material (for example, "Nafion (registered trademark)" manufactured by E. I. du Pont de Nemours & Co.); a hydrocarbon based proton-conducting material such as polyimide sulfonic acid; and a fullerene-based proton-conducting material.

Each of the anode electrode 132 and the cathode electrode 133 has a structure in which a catalyst layer containing a catalyst such as platinum (Pt) and ruthenium (Ru) is formed on a gas diffusing base-material formed of, for example, a carbon paper. The catalyst layer is structured by, for example, a resultant in which a support such as a carbon black supporting a catalyst is dispersed in a material such as the poly perfluoro alkyl sulfonic acid based proton-conducting material. To the anode electrode 132, liquid fuel containing such as methanol is supplied in the form of gas, through openings 111A provided in the anode-side plate-like member 111. Additionally, the cathode electrode 133 communicates with the outside through openings 112A provided in the cathode-side plate-like member 112, whereby air, i.e., oxygen, is supplied by natural ventilation or an air supply pump (unillustrated).

Figure 2:
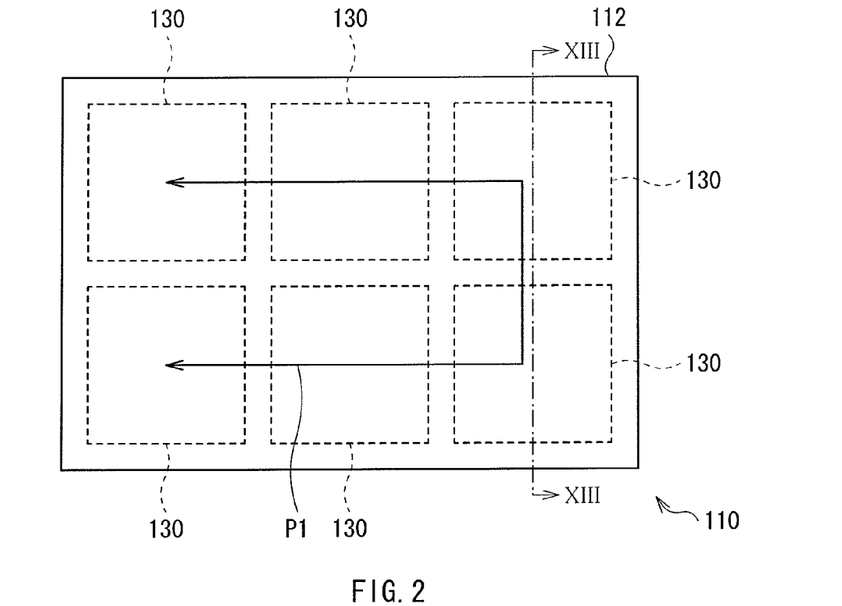
FIG. 2 is a plan view showing a configuration of a main body of the fuel cell shown in FIG. 1, which is viewed from a cathode-side plate-like member.

FIG. 2 shows a planar configuration of the fuel cell main body 110 shown in FIG. 1, which is viewed from the cathode-side plate member 112. A total of six joined bodies 130 are arranged in a 3-by-2 matrix in an in-plane direction, for example. Additionally, these six joined bodies 130 are electrically connected in series to one another by an unillustrated power collector structure, for example, as denoted by sign P1.

The fuel cartridge 120 shown in FIG. 1 is provide on the anode-side plate member 111 side of the fuel cell main body 110, and includes: a liquid container section 121 to store liquid fuel A1; a vaporization section 122; and a detector 1 described later. The liquid container section 121 has, for example, a flat rectangular solid shape. The liquid container section 121 and the vaporization section 122 are connected to each other with a flow path 123. The flow path 123 is provided with a pump 124, whereby the liquid fuel A1 in the liquid container section 121 is drawn up by the pump 124 and transported in one direction B1 to the vaporization section 122. Note that an unillustrated vent hole is provided in the liquid container section 121, whereby the inside of the liquid container section 121 is normally in a state where the liquid fuel A1 and air A2 coexist.

The vaporization section 122 is for vaporizing the liquid fuel A1 supplied from the liquid container section 121 and for, based on the theory of distillation, removing low vapor pressure impurities (such as ionic impurities and a high-molecular-weight plasticizer) contained in the fuel. The vaporization section 122 has a thickness of, for example, about 0.1 mm to 1.0 mm, and is a section in which a diffusion section (unillustrated) for encouraging diffusion of the fuel is provided on a plate-like member (unillustrated) formed of a metal or an alloy containing such as stainless steel and aluminum, or formed of a resin material having high rigidity such as a cyclo-olefin copolymer (COC). For the diffusion section, an inorganic porous material such as alumina, silica and titanium oxide, or a resin porous material can be used. Alternatively, for the vaporization section 122, a section is preferable in which plate-like members formed of stainless steel are laminated to provide an internal flow path. This enables efficient supply of fuel, thereby advantageously achieving a thinner size. A surface of the vaporization section 122 is formed with nozzle sections 122A serving as exhaust nozzles for fuel. The nozzle section 122A has an aperture of, for example, 0.1 mm to 0.5 mm in diameter.

A sealing layer 140 is provided between the fuel cell main body 110 and the vaporization section 122. This sealing layer 140 is provided in an outer circumferential section of the fuel cell main body 110, and is structured by, for example, a resin material such as silicone rubber, ethylene-propylene-diene rubber, and Teflon (registered trademark). This provides a certain space S between the fuel cell main body 110 and the vaporization section 122. The space S allows the fuel ejected from the vaporization section 122 to be further diffused, and allows the fuel to be evenly supplied to the fuel cell main body 110.

Figure 3:
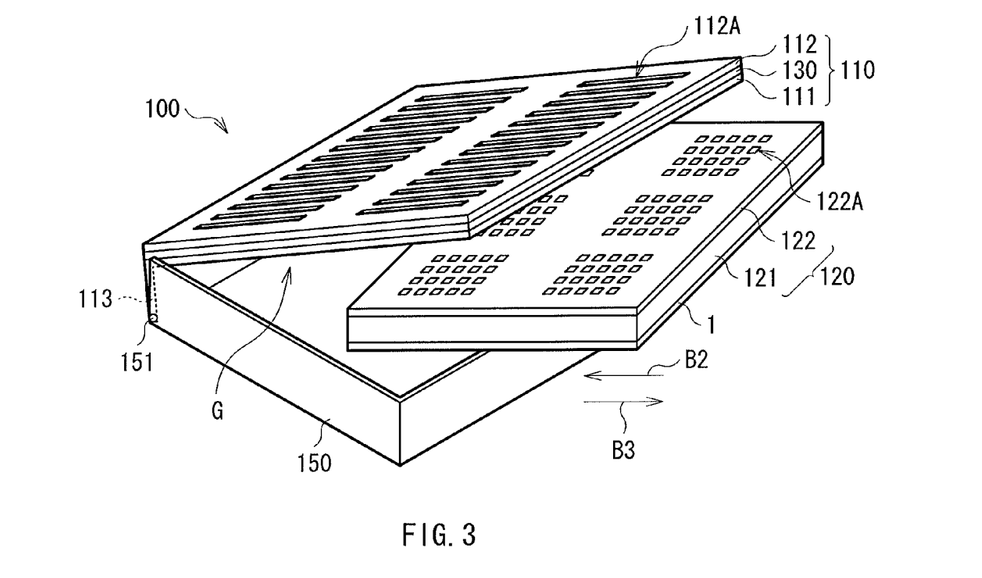
FIG. 3 is a perspective view showing a main part of the fuel cell shown in FIG. 1.

It is preferable that the fuel cartridge 120 be attachable to and detachable from the fuel cell main body 110, for example, as shown in FIG. 3. The impurities contained in the fuel are concentrated in the vaporization section 122, and may lower a function of supplying the fuel due to long-term use. By allowing the fuel cartridge 120 to be attachable and detachable, it is possible to replace the vaporization section 122 at the time of replacement of the fuel cartridge 120, and to periodically remove residuals left after evaporation of impurities concentrated in the vaporization section 122.

Specifically, a storage member 150 with an upper face and one of four side faces are open is arranged at a lower part of the fuel cell main body 110. The fuel cell main body 110 covers an upper face of the storage member 150. One of the cathode-side plate member 111 and the anode-side plate member 112 is provided with a projecting piece 113 that corresponds to the open side face of the storage member 150. This projection piece 113 is rotatably coupled to the storage member 150 by a hinge 151, whereby the fuel cell main body 110 is openable and closable with respect to the storage member 150. The fuel cartridge 120 is so configured as to be put into the inside of the storage member 150 from a clearance G between the storage member 150 and the anode-side plate-like member 112 in a direction of an arrow B2, or to be taken out in a direction of an arrow B3 which is the opposite to the arrow B2. Note that a bottom face of the inside of the storage member 150 is provided with an unillustrated section for storing a control circuit and the like.

Figure 4:
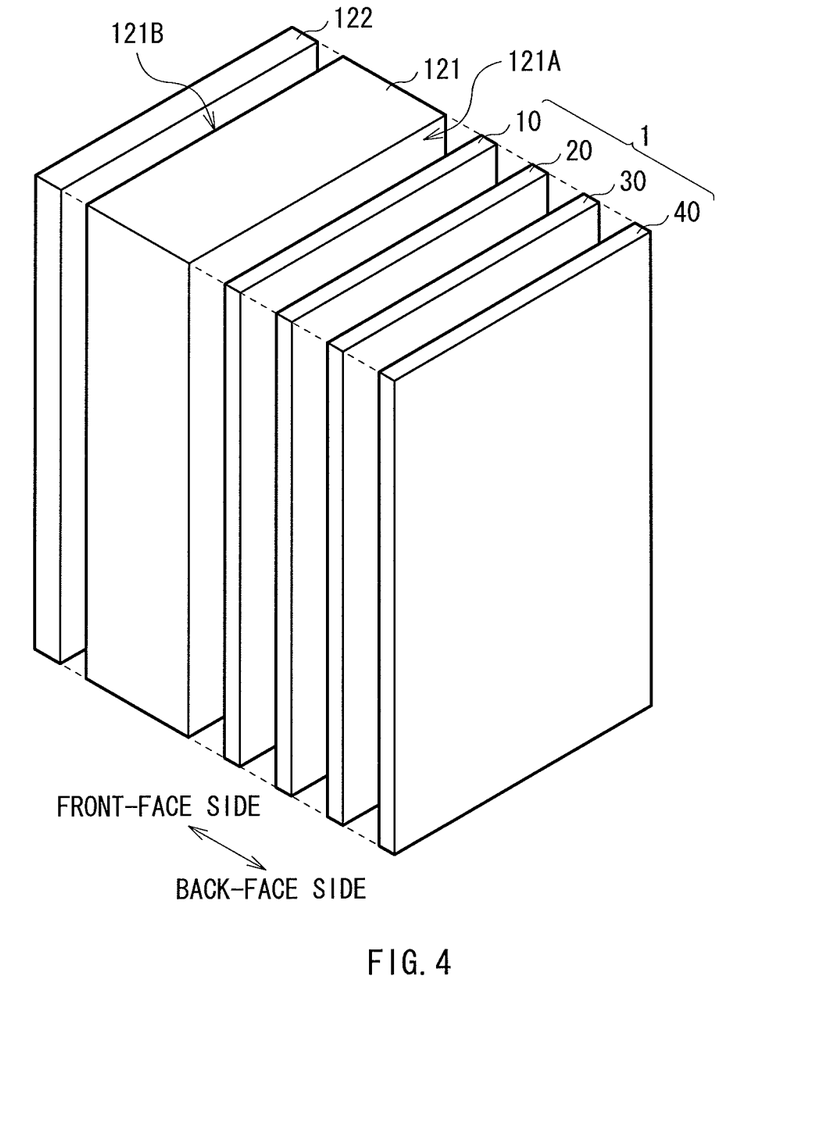
FIG. 4 is a perspective view showing external appearances of the fuel cell shown in FIG. 1 and a detector.

The detector 1 is for detecting the volume of the liquid fuel A1 stored in the liquid container section 121, and is equivalent to one face of the liquid container section 121. The detector 1 may be provided in any one of the six faces of the liquid container section 121. For example, as shown in FIG. 4, the detector 1 and the vaporization section 122 are provided in one face 121A and the other face 121B, respectively, of two faces having the largest area among the six faces of the liquid container section 121. Note that the detector 1 may be provided in each of all the six faces of the liquid container section 121, or may be provided for three faces that surround one corner of the liquid container section 121. This makes it possible to detect the volume of the liquid fuel A1 regardless of an attitude of the liquid container section 121.

The detector 1 has a configuration in which a first board 10, a second board 20, a third board 30, and a fourth board 40 are stacked in order from the liquid container section 121 side, for example. The first board 10 to the fourth board 40 are each structured by a printed board, for example.

Figure 5:
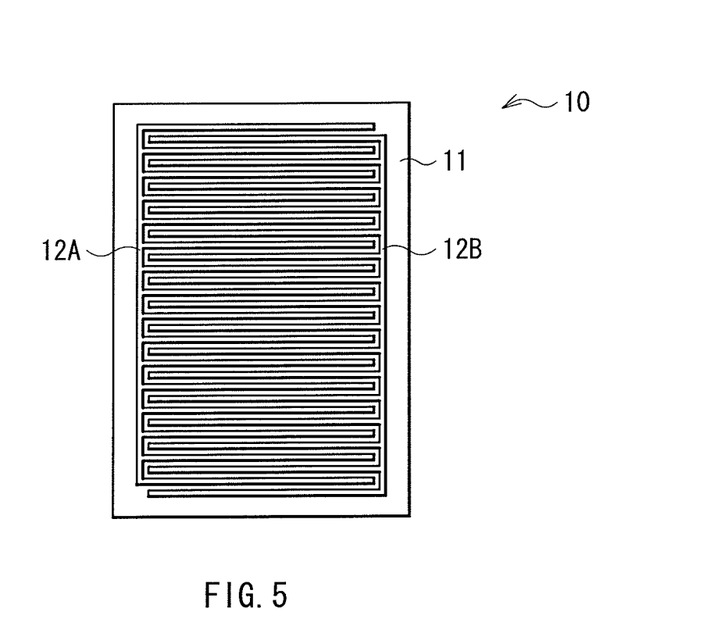
FIG. 5 is a plan view showing a configuration of a first board of the detector shown in FIG. 4, which is viewed from a liquid container portion.
Figure 6:
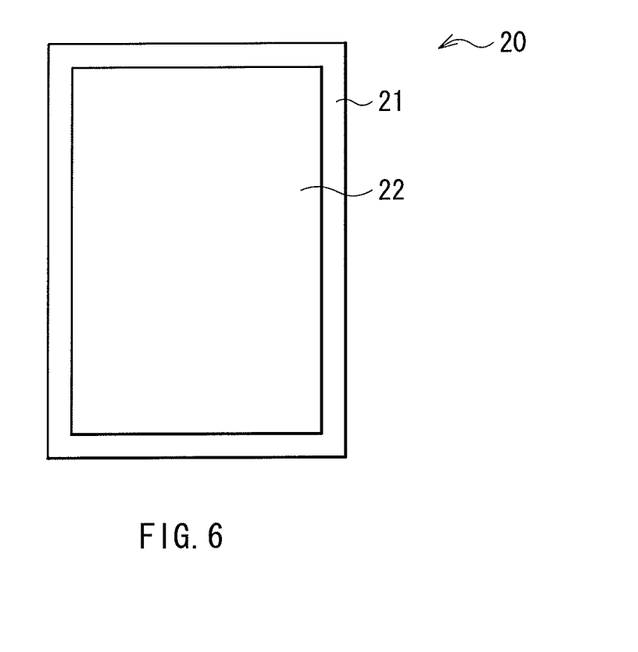
FIG. 6 is a plan view showing a configuration of a second board, which is viewed from the liquid container portion.

FIGS. 5 and 6 show planar configurations of the first board 10 and the second board 20, respectively, which are viewed from the liquid container section 21. The first board 10 has, for example, a pair of detection electrodes 12A and 12B on a surface of a base material 11, which are for detecting a stray capacitance. This pair of detection electrodes 12A and 12B contact directly (in a case where a protective layer 14 described later is not provided) or indirectly (in a case where the protective layer 14 is provided) to the liquid fuel A1 in the liquid container section 121. The second board 20 has a shielding electrode 21 on a base material 21, and arranged on the back face side of the first board 10. Hence, in the fuel cartridge 120 and the fuel cell 100, it is possible to reduce an influence of disturbance on measurement results, and to measure the accurate volume.

It is preferable that the detection electrodes 12A and 12B occupy substantially the entire one face (the face 121A in this embodiment) of the liquid container section 121. This is because this allows the volume to be measured accurately even it is overturned about the normal, as an axis of rotation, of the first board 10 (a surface of the base material 11).

Figure 7:
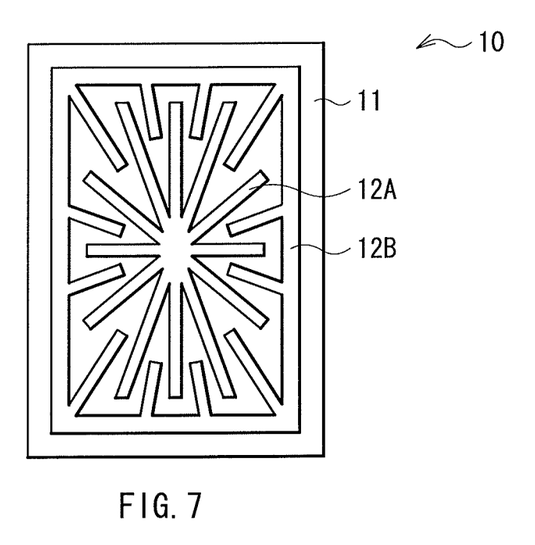
FIG. 7 is a plan view showing another configuration of the first board.

The shapes of the detection electrodes 12A and 12B are not particularly limited as long as a clearance 13 between the detection electrodes 12A and 12B is provided in an isotropic form (in a manner distributed uniformly throughout the entire surface of the base material 11). For example, a shape of comb-tooth engaged with each other with a spacing therebetween as shown in FIG. 6 is preferable as specific shapes of the detection electrodes 12A and 12B. Also, as shown in FIG. 7, the detection electrode 12A may radiate toward an outer circumference of the base material 11 from one point in the center thereof, whereas the detection electrode 12B may radiate toward the center from a frame of a shape (for example, rectangular shape) which is along the outer circumference of the base material 11. Alternatively, the detection electrodes 12A and 12B may be unillustrated multiple parallel straight lines.

Figure 8:
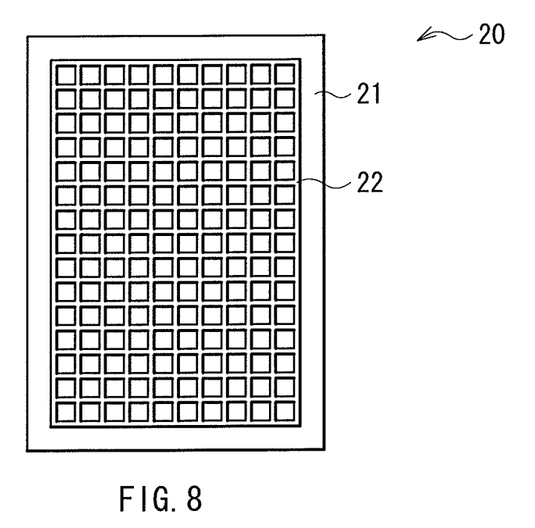
FIG. 8 is a plan view showing another configuration of the second board.
Figure 9:
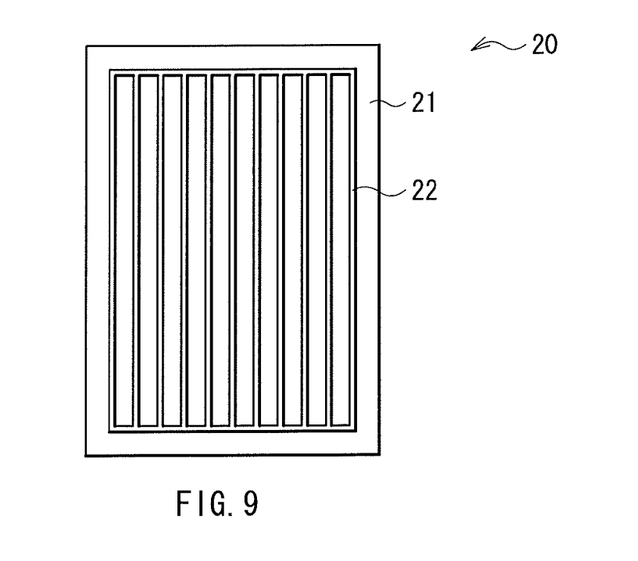
FIG. 9 is a plan view showing still another configuration of the second board.

The shielding electrode 22 of the second board 20 is for, when a hand or the like is brought close to the detector 1, preventing the detection electrodes 12A and 12B from sensing a stray capacitance generated as a result, and is provided, for example, on a surface (a face on the liquid container section 121 side) of the base material 21. The shape of the shielding electrode 22 is not particularly limited as long as the shielding electrode 22 is so provided as to distribute uniformly throughout the entire surface of the base material 21 of the second board 20. Specifically, the shielding electrode 22 may be provided, with no spacing (in a solid form), on substantially the entire surface of the base material 21 of the second board 20 as shown in FIG. 6, for example. Also, the shielding electrode 22 may be in a grid-like shape (mesh-shaped) as shown in FIG. 8, or may be in parallel lines (slit-shaped) as shown in FIG. 9.

Figure 10:
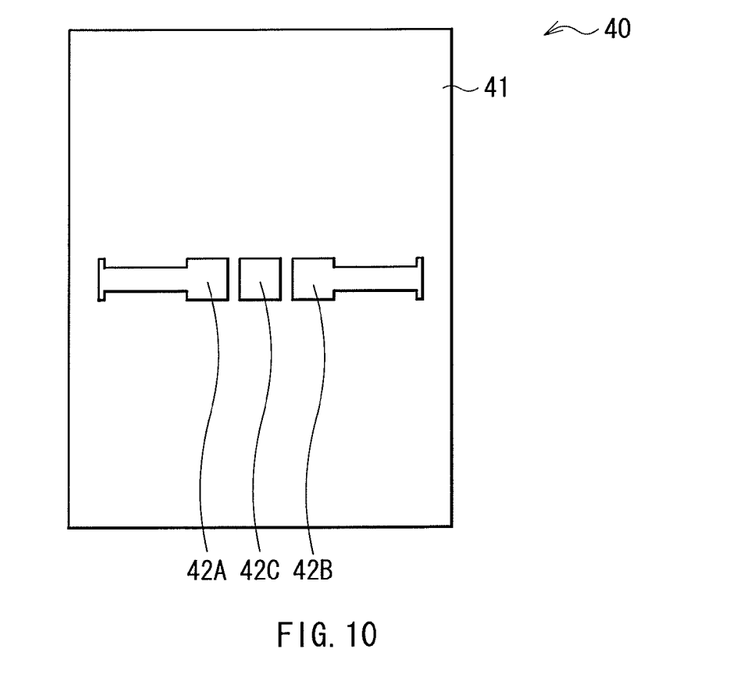
FIG. 10 is a plan view showing a configuration of a fourth board.

For example, only a via hole (unillustrated) is provided in the third board 30. The fourth board 40 has three lands 42A, 42B, and 42C provided on a base material 41, for example, as shown in FIG. 10.

Figure 11:
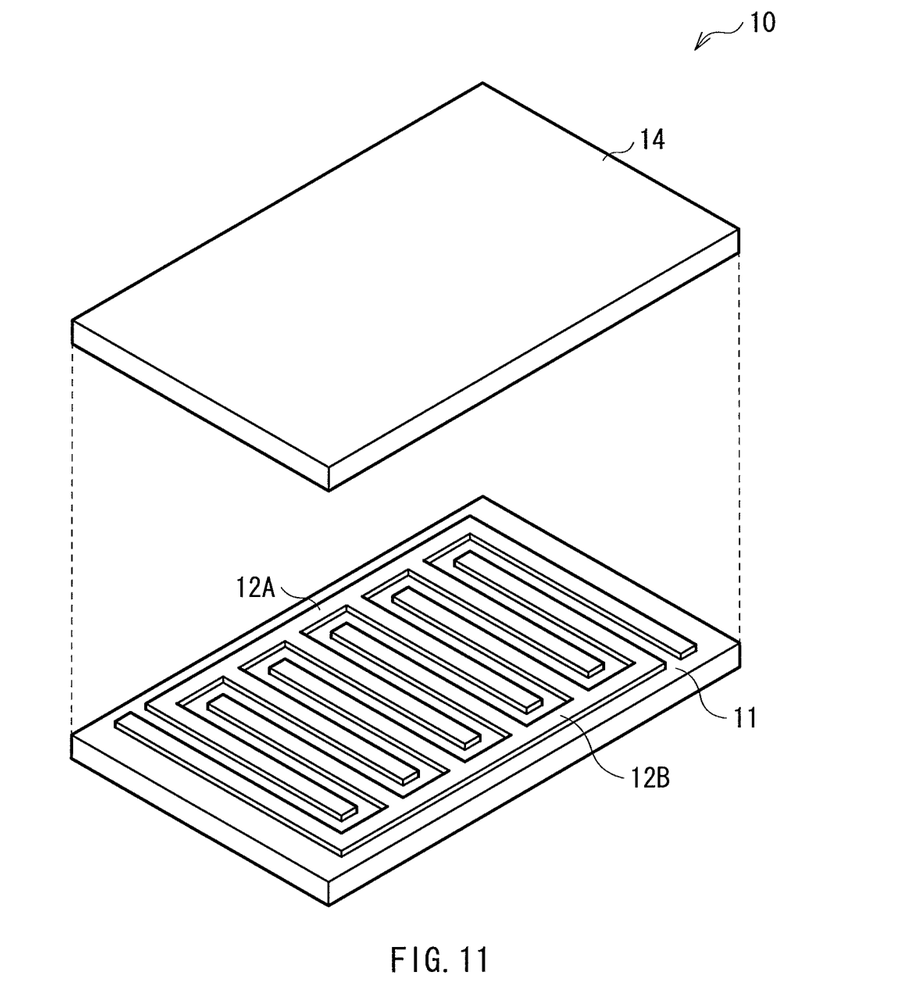
FIG. 11 is an exploded perspective view of the first board.

FIG. 11 shows, in an exploded fashion, the first board 10. It is preferable that the protective layer 14 be arranged on the front surface of the board 10, i.e., on the face of the base material 11 on which the detection electrodes 12A and 12B are provided. This is because it makes it possible to prevent liquid that is strong in polarity, such as methanol and water, from directly contacting the detection electrodes 12A and 12B, and to exclude measurement errors attributable to an electric double layer. The protective layer 14 is structured by, for example, a coating layer such as a thin resin film or a resist, and preferably has an appropriate thickness to an extent that it does not interfere the measurement performance of the detection electrodes 12A and 12B.

Additionally, it is preferable that cosine of a contact angle of the liquid fuel A1 relative to the protective layer 14 be negative, i.e., the protective layer 14 have water repellency, since this suppresses a surface of the protective layer 14 from becoming continuously wet by the liquid fuel A1 due to a surface tension, and enables the correct volume measurement.

Figure 12:
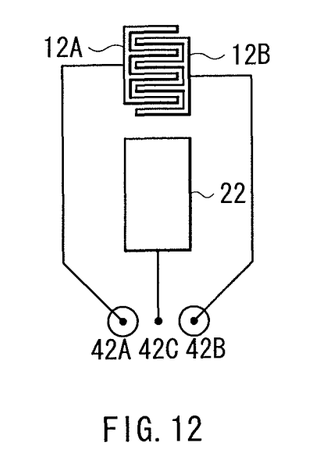
FIG. 12 is a diagram showing one example of a connection relation among the first board, the second board, and the fourth board.
Figure 13:
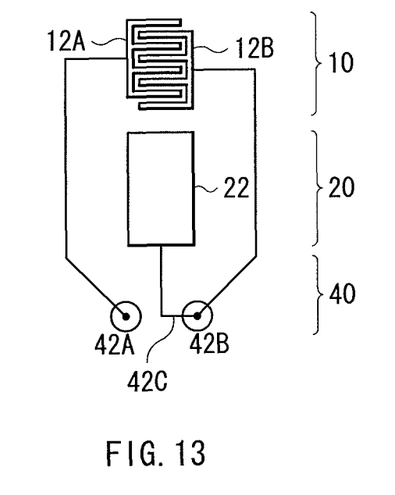
FIG. 13 is a diagram showing another example of the connection relation shown in FIG. 12.

FIGS. 12 and 13 each show a connection relation among the first board 10, second board 20, and fourth board 40. Among the three lands 42A to 42C of the fourth board 40, two lands 42A and 42B are connected to the detection electrodes 12A and 12B, respectively. The remaining one land 42C is connected to the shielding electrode 22. Note that the shielding electrode 22 may be set to be in a floated state (floating state) as shown in FIG. 12, or may be set in a state connected to one of the detection electrodes, which is the detection electrode 12B, as shown in FIG. 13.

Figure 14:
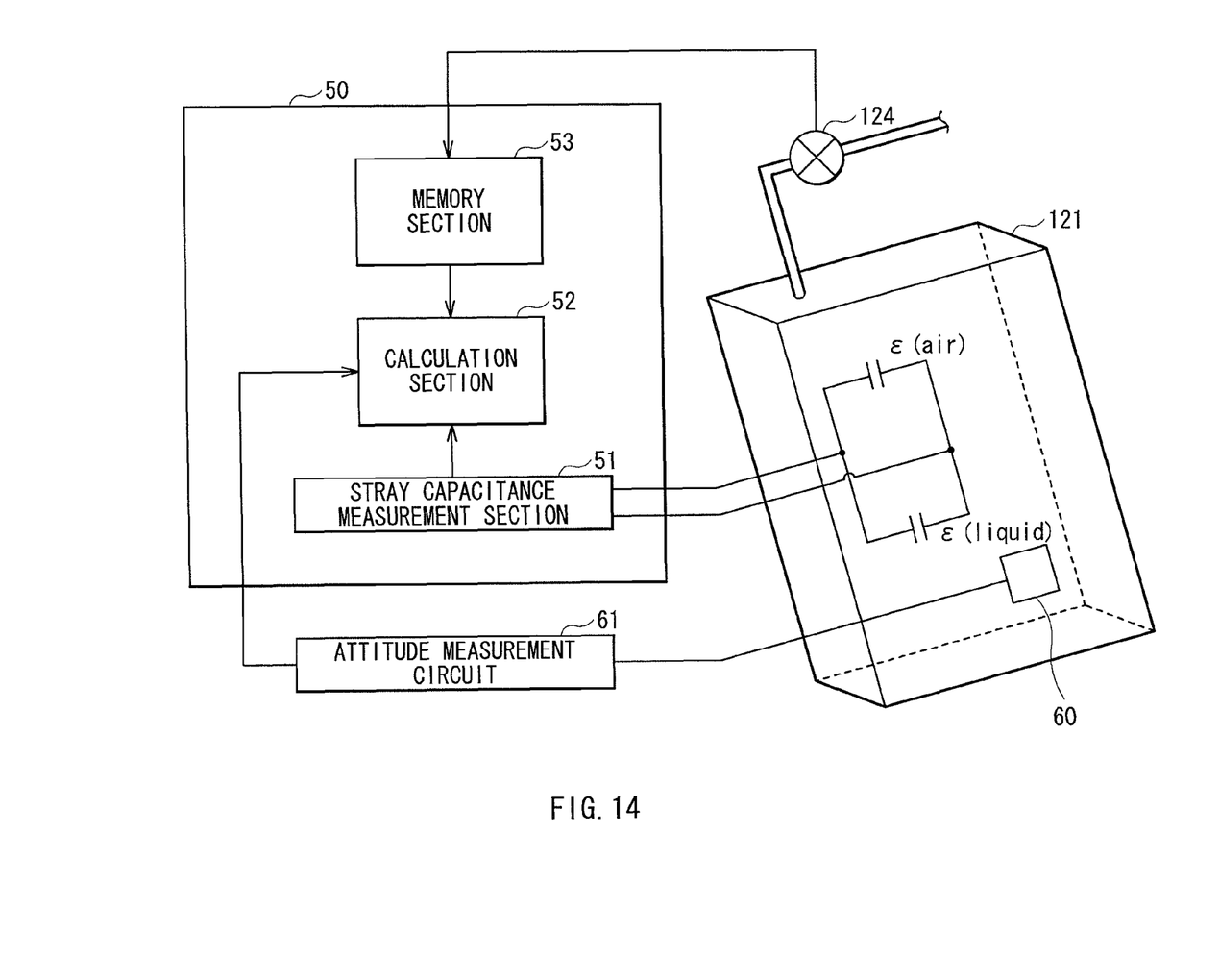
FIG. 14 is a diagram showing a configuration of a volume measurement circuit.

FIG. 14 shows a configuration of a volume measurement circuit which measures a stray capacitance of the pair of detection electrodes 12A and 12B in the detector 1. For example, this volume measurement circuit 50 is provided on a volume-measurement-circuit-mounted printed board (unillustrated in FIG. 4) that is closer to the outside than the first board 10, second board 20, and fourth board 40. For example, the volume measurement circuit 50 includes a stray capacitance measurement section 51, a calculation section 52, and a memory section 53.

The stray capacitance measurement section 51 measures a stray capacitance of the detection electrodes 12A and 12B. The calculation section 52 calculates the volume of the liquid fuel A1 based on a measurement result of the stray capacitance measurement section 51.

The memory section 53 stores an operation history (for example, the total number of times the pump 124 has been driven) of the liquid pump 124. Additionally, the calculation section 52 preferably calculates, based on the operation history stored in the memory section 53, an amount of the liquid fuel A1 that has been drawn up, and calculates the volume of the liquid fuel A1 based on both the calculated amount that has been drawn up and the stray capacitance. By combining a relative measurement based on the total number of times the pump has been driven and an absolute measurement which calculates based on the stray capacitance, the remaining amount measurement of higher precision is possible.

Further, the detector 1 has an acceleration sensor 60 and an attitude measurement circuit 61. The acceleration sensor 60 is for measuring an attitude of the liquid container section 121 relative to the vertical direction, and is attached to the face 121A of the liquid container section 121 on which the detector 1 is provided. The attitude measurement circuit 61 measures the attitude of the liquid container section 121 based on a measurement result of the acceleration sensor 60.

The calculation section 52 of the volume measurement circuit 50 preferably calculates the volume of the liquid fuel A1 based on information on the attitude of the liquid container section 121 acquired from the acceleration sensor 60. In a case where the detector 1 is provided only in a particular face of the liquid container section 121, there is a possibility that the measurement result becomes inaccurate depending on the attitude of the liquid container region 121. The accurate measurement is enabled by checking the attitude of the liquid container section 121 by the acceleration sensor 60, and performing the measurement, for example, only when the acceleration in a direction of normal of the first board 10 is zero.

This fuel cell 100 may be manufactured, for example, in the following manner.

First, the first board 10 to the fourth board 40 are laminated to form the detector 1, and this detector 1 is disposed on the face 121A of the liquid container section 121.

Also, the vaporization section 122 is disposed on the face 121B of the liquid container section 121, and the liquid container section 121 and vaporization section 122 are connected with the flow path 123. The pump 124 is provided to the flow path 123. Thus, the fuel cartridge 120 shown in FIG. 1 is formed.

Further, the electrolyte membrane 131 formed of the material described above is sandwiched between the anode electrode 132 and cathode electrode 133 and is subjected to thermal compression bonding, to thereby join the anode electrode 132 and the cathode electrode 133 to the electrolyte membrane 131 and to form the joined bodies 130. Thereafter, the joined bodies 130 are electrically connected in series, and then disposed between the anode-side plate-like member 111 and the cathode-side plate-like member 112. The fuel cell main body 110 shown in FIG. 1 is thus formed. Finally, the fuel cartridge 120 is disposed on the outside of the anode-side plate-like member 111 of the fuel cell main body 110. The fuel cell 100 shown in FIG. 1 is thus completed.

In this fuel cell 100, the liquid fuel A1 is supplied from the liquid container section 121 to the anode electrodes 132 of the respective joined bodies 130 to generate protons and electrons by reactions. The protons move to the cathode electrodes 133 through the electrolyte membrane 131, and react with the electrons and oxygen to generate water. Thus, a part of chemical energy of the liquid fuel A1, i.e., methanol, is converted into electric energy, which is taken out as an electric current by which an external load is driven.

Here, as shown in FIG. 14, the pair of detection electrodes 12A and 12B having a shape of comb-tooth directly or indirectly contact with the liquid fuel A1 or the air A2. The stray capacitance that has occurred in these detection electrodes 12A and 12B is measured by the stray capacitance measurement section 51 in the volume measurement circuit 50. Because the dielectric constant $\in$liquid (in the case of methanol, 32.6) of the liquid fuel A1 is different greatly from the dielectric constant $\in$air (=1) of the air A2, this stray capacitance linearly changes in response to the volume (remaining amount) of the liquid fuel A1 in a case where the liquid container section 121 is the rectangular solid. Therefore, the calculation section 52 is capable of calculating the volume (remaining amount) of the liquid fuel A1 based on the measurement result of the stray capacitance measurement section 51.

In this case, the second board 20 having the shielding electrode 22 is arranged on the back face side of the first board 10, whereby, even when a hand or the like is brought close to the detector 1, the detection electrodes 12A and 12B are prevented from sensing the stray capacitance generated as a result. Therefore, the influence of disturbance on the measurement results is reduced, making it possible to estimate an available remaining time based on the accurate remaining amount of the liquid fuel A1.

On the other hand, the memory section 53 stores an operation history (for example, the total number of times the pump 124 has been driven) of the liquid pump 124. Based on the operation history stored this memory section 53, the calculation section 52 calculates the amount of the liquid fuel A1 that has been drawn up, in accordance with the formula V1−V2×n (where V1 denotes the inner volume of the liquid container section 121, V2 denotes the volume sent in a liquid form per one time the pump 124 is driven, and n denotes the total number of times the pump 124 has been driven). The calculation section 52 calculates the volume of the liquid fuel A1 based on both the calculated amount that has been drawn up and the stray capacitance, thereby making it possible to measure a remaining amount with higher accuracy.

Further, the calculation section 52 performs the measurement of the volume of the liquid fuel A1 described above only when the acceleration sensor 60 finds that the liquid container section 121 is in an appropriate attitude. Thus, even in a case where the detector 1 is provided only in a particular face of the liquid container section 121, a measurement result does not become inaccurate due to the attitude of the liquid container section 121, whereby the accurate measurement is enabled.

As described above, in this embodiment, the pair of detection electrodes 12A and 12B are provided on the front face of the first board 10 of the detector 1, and a stray capacitance is detected by bringing this pair of detection electrodes 12A and 12B into direct or indirect contact with the liquid fuel A1 in the liquid container section 121. On the other hand, the second board 20 including the shielding electrode 22 is arranged on the back face side of the first board 10. Thus, the influence of disturbance on a measurement result is reduced, making it possible to measure the accurate volume. Therefore, the estimation of an available remaining time based on the accurate remaining amount of the liquid fuel A1 is possible, by which the convenience is improved, and which is suitable particularly for fuel cells to be mounted on electronic devices of portable use.

Additionally, it is possible to easily form the detection electrodes 12A and 12B on the first board 10 such as a printed board, whereby, unlike a method in the past in which a capacitance between two parallel flat-plate electrodes is detected, there is no need to shorten a distance between the flat-plate electrodes so as to obtain a sufficient detection sensitivity. Therefore, while low-cost manufacturing is made possible, it is made possible to prevent the water level from changing due to surface tension and influencing the measurement results.

Further, the protective layer 14 configured of the coating layer such as a thin resin film and a resist is provided on the front face of the first board 10, whereby there is no chance that the liquid fuel A1 comes into direct contact with the detection electrodes 12A and 12B. Therefore, when polar molecules of methanol or the like are measured, occurrence of an electric double layer on surfaces of the detection electrodes 12A and 12B is suppressed, making it possible to allow measurement errors to be extremely small.

EXAMPLES

Further, specific Examples of the present invention are described. [No. 1 to No. 8]

The detectors 1 having a size of 19 mm by 35 mm were fabricated in a manner similar to that in the above described embodiment. In fabrication, four-layer printed boards were used as the first board 10 to the fourth board, and the pair of detection electrodes 12A and 12B having the shape of the comb-tooth as shown in FIG. 5 were formed on the first board 10 in such a manner as to engage with each other with a spacing therebetween. On the second board 20, the shielding electrode 22, which is either solid as shown in FIG. 6 or mesh-shaped as shown in FIG. 8, was formed. Only a via hole was formed in the third board 30. On the fourth board 40, the three lands 42A to 42C were formed as shown in FIG. 10. Among the three lands 42A to 42C, the two lands 42A and 42B were connected with the detection electrodes 12A and 12B, respectively, and the remaining one land 42C was connected to the shielding electrode 22.

Table 1 shows the details of eight kinds of detectors 1 (No. 1 to No. 8) that were fabricated. As to the first board 10, the coating layer configured of a resist having a thickness of 35 µm was formed as the protective layer 14 on the front face thereof in each of No. 1 to No. 4, whereas the detection electrodes 12A and 12B were gold-plated without providing the protective layer 14 in each of No. 5 to No. 8. A width of the combs (lines) of the detection electrodes 12A and 12B was set to 75 µm in Nos. 1, 2, 5, and 6 and 225 µm in Nos. 3, 4, 7, and 8. A width of the spacing (space) 13 between the detection electrodes 12A and 12B was set to 75 µm in all of No. 1 to No. 8. As to the second board 20, the shielding electrode 22 was formed in a meshed shape in each of Nos. 2, 4, 6, and 8, whereas the shielding electrode 22 was formed in solid in each of Nos. 1, 3, 5, and 7.

TABLE 1

| | Protective layer | Detection electrodes | Shielding electrode |
|---|---|---|---|
| No. 1 | Provided | Line: 75 µm | Solid |
| No. 2 | (coating layer | Space: 75 µm | Mesh-shaped |
| No. 3 | configured of 35 µm | Line: 225 µm | Solid |
| No. 4 | thick resist) | Space: 75 µm | Mesh-shaped |
| No. 5 | Not provided | Line: 75 µm | Solid |
| No. 6 | (detection electrodes | Space: 75 µm | Mesh-shaped |
| No. 7 | gold-plated) | Line: 225 µm | Solid |
| No. 8 | | Space: 75 µm | Mesh-shaped |

With respect to each of the eight kinds of experimentally-produced detectors 1 (No. 1 to No. 8), two types of detectors 1 were further prepared, which were one having the shielding electrode 22 floated (in a floating state) as shown in FIG. 11, and the other having the shielding electrode 22 connected to the detection electrode 12B of the pair as shown in FIG. 12 (16 kinds in total).

Figure 15:
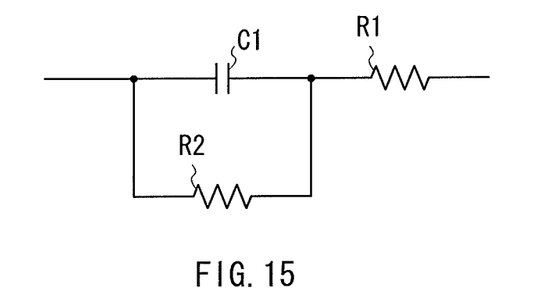
FIG. 15 is a diagram showing an equivalent circuit used in Examples of the present invention.

For each of the cases where these 16 kinds of detectors 1 were dipped in air and in 100% methanol, an alternating current voltage of 10 to 100 kHz (with an amplitude of ±10 mV) was applied across the detection electrodes 12A and 12B to measure a current, and an equivalent circuit satisfying a bode plot obtained thereby was found in such a manner as to apply the equivalent circuit to a circuit in FIG. 15. Results obtained thereby are shown in Tables 2 and 3. Note that, in the circuit of FIG. 15, a capacitor C1 and a resistor R1 are connected in series, and the capacitor C1 and a resistor R2 are connected in parallel.

TABLE 2

| | Protective layer | Detection electrodes | Shielding electrode | Equivalent element | In air | In methanol | Rate of change |
|---|---|---|---|---|---|---|---|
| No. 1 (floating) | Provided (coating layer configured of 35 µm-thick resist) | Line: 75 µm Space: 75 µm | Solid | C1 | 200 pF | 350 pF | +71% |
| | | | | R1 | — | — | — |
| | | | | R2 | >1G Ω | >1G Ω | — |
| No. 1 | | | | C1 | 290 pF | 440 pF | +54% |
| | | | | R1 | — | — | — |
| | | | | R2 | >1G Ω | >1G Ω | — |
| No. 2 (floating) | | | Mesh-shaped | C1 | 210 pF | 350 pF | +71% |
| | | | | R1 | — | — | — |
| | | | | R2 | >1G Ω | >1G Ω | — |
| No. 2 | | | | C1 | 260 pF | 420 pF | +59% |
| | | | | R1 | — | — | — |
| | | | | R2 | >1G Ω | >1G Ω | — |
| No. 3 (floating) | | Line: 225 µm Space: 75 µm | Solid | C1 | 140 pF | 320 pF | +130% |
| | | | | R1 | — | — | — |
| | | | | R2 | >1G Ω | >1G Ω | — |

TABLE 2-continued

| | Protective layer | Detection electrodes | Shielding electrode | Equivalent element | In air | In methanol | Rate of change |
|---|---|---|---|---|---|---|---|
| No. 3 | | | | C1 | 200 pF | 440 pF | +120% |
| | | | | R1 | — | — | — |
| | | | | R2 | >1G Ω | >1G Ω | — |
| No. 4 (floating) | | | Mesh-shaped | C1 | 130 pF | 320 pF | +151% |
| | | | | R1 | — | — | — |
| | | | | R2 | >1G Ω | >1G Ω | — |
| No. 4 | | | | C1 | 180 pF | 380 pF | +114% |
| | | | | R1 | — | — | — |
| | | | | R2 | >1G Ω | >1G Ω | — |

TABLE 3

| | Protective layer | Detection electrodes | Shielding electrode | Equivalent element | In air | In methanol | Rate of change |
|---|---|---|---|---|---|---|---|
| No. 5 (floating) | Not provided (detection electrodes gold-plated) | Line: 75 μm Space: 75 μm | Solid | C1 | 160 pF | 3.7 μF | +2300000% |
| | | | | R1 | — | 800 Ω | — |
| | | | | R2 | >1G Ω | 7.2k Ω | — |
| No. 5 | | | | C1 | 220 pF | 3.8 μF | +1700000% |
| | | | | R1 | — | 780 Ω | — |
| | | | | R2 | >1G Ω | 7.4k Ω | — |
| No. 6 (floating) | | | Mesh-shaped | C1 | 160 pF | 4.1 μF | +2600000% |
| | | | | R1 | — | 400 Ω | — |
| | | | | R2 | >1G Ω | 8.6k Ω | — |
| No. 6 | | | | C1 | 200 pF | 4.1 μF | +2000000% |
| | | | | R1 | — | 400 Ω | — |
| | | | | R2 | >1G Ω | 8.5k Ω | — |
| No. 7 (floating) | | Line: 225 μm Space: 75 μm | Solid | C1 | 110 pF | 3.7 μF | +3400000% |
| | | | | R1 | — | 680 Ω | — |
| | | | | R2 | 48M Ω | 7.5k Ω | — |
| No. 7 | | | | C1 | 180 pF | 3.7 μF | +2100000% |
| | | | | R1 | — | 810 Ω | — |
| | | | | R2 | >1G Ω | 7.5k Ω | — |
| No. 8 (floating) | | | Mesh-shaped | C1 | 90 pF | 3.8 μF | +4300000% |
| | | | | R1 | 130 Ω | 810 Ω | +530% |
| | | | | R2 | 44k Ω | 5.6k Ω | — |
| No. 8 | | | | C1 | 150 pF | 3.8 μF | +2500000% |
| | | | | R1 | 70 Ω | 2.3k Ω | +1000% |
| | | | | R2 | 43k Ω | 5.6k Ω | — |

As can be seen from Tables 2 and 3, in the cases (No. 1 to No. 4) where the coating layer configured of a resist was formed as the protective layer 14 on the front face of the first board 10, changes in capacitance were too small. In the cases (No. 5 to No. 8) where the detection electrodes 12A and 12B were gold-plated without the protective layer 14 provided, remarkably large changes in capacitance were observed. It was suggested that, while the thickness of the protective layer 14 was set to 35 μm, this was too thick as a sensor surface. With respect to the cases where gold-plating was applied, changes in capacitance were extremely large, which is considered to be attributable to an electric double layer capacitance. In addition, a value of the resistor R1 was low, and a leakage current was generated. It was found that none of the conditions in the respective examples No. 1 to No. 8 were appropriate for a sensor.

[No. 8 Revised]

The detector 1 was fabricated in a manner similar to that of the example No. 8 except that, as the protective layer 14, a thin film having a thickness of 9 μm and configured of PET resin was adhered by welding to the front face of the first board 10. With respect to the thus-obtained detector 1 (No. 8 revised), an alternating-current voltage was applied under the condition similar to that in the cases of No. 1 to No. 8 to perform measurement of a current. Results obtained thereby are shown in Table 4.

TABLE 4

| | Protective layer | Detection electrodes | Shielding electrode | Equivalent element | In air | In methanol | Rate of change |
|---|---|---|---|---|---|---|---|
| No. 8 Revised (floating) | Provided (thin film configured of 9 μm-thick PET) (detection electrodes gold-plated) | Line: 225 μm Space: 75 μm | Mesh-shaped | C1 | 110 pF | 17000 μF | +160000% |
| | | | | R1 | — | 2.3k Ω | — |
| | | | | R2 | 44k Ω | 63k Ω | — |
| No. 8 Revised | | | | C1 | 170 pF | 18000 μF | +110000% |
| | | | | R1 | — | 2.0k Ω | — |
| | | | | R2 | >1G Ω | 51k Ω | — |

As can be seen from Table 4, the detector 1 (No. 8 revised) was successful in obtaining a large change in capacitance and in preventing a leakage current. Additionally, in principle, formation of an electric double layer is not possible in the detector 1 (No. 8 revised) because the front face of the first board 10 is covered with the protective layer 14 configured of the thin film. Therefore, the detector 1 (No. 8 revised) was considered to be most preferable in terms of practical use.

Incidentally, with respect to the thickness of the combs (lines) of the detection electrodes 12A and 12B in Tables 2 and 3, the examples with the thickness of 225 μm (Nos. 3, 4, 7, and 8) had larger changes in capacitance and had better sensitivities than those with the thickness of 75 μm (Nos. 1, 2, 5, and 6). With respect to the shielding electrode 22, the examples with solid (Nos. 1, 3, 5, and 7) and those with mesh (No. 2, 4, 6, and 8) did not show significant differences. During the experiment, however, all of these cases were insensitive to a finger or the like brought close thereto, which confirmed that a shielding effect of the shielding electrode 22 was present. As to the difference between having the shielding electrode 22 in the floating state and having the shielding electrode 22 connected to the detection electrode 12B of the pair, it was found that a larger change in capacitance was obtained by having the shielding electrode 22 in the floating state.

Based on the above knowledge, another detector 1 was fabricated based on conditions in which: each of the detection electrodes 12A and 12B had a thickness of 225 μm and gold-plated; the thin film configured of PET resin was provided as the protective layer 14 on the front face of the first board 10; and the shielding electrode 22 was solid and floated, and the detector 1 was caused to correspond to one face of the liquid container section 121, to experimentally produce the fuel cartridge 120. When the liquid fuel A1 (methanol) inside the liquid container section 121 was sent into and out of the thus-obtained fuel cartridge 120 by use of a syringe, the height of a liquid level inside the liquid container section 121 was detected, and was successfully acquired as analog data.

Although the present invention has been described hereinabove with reference to the embodiment and Examples, the present invention is not limited to the above embodiment and Examples, and may be modified in various ways. For example, the material and thickness of each element and the measurement conditions described in connection with the above embodiment and Examples are not limited, and other materials, other thickness, and other measurement conditions may be employed therefor. For example, other than the methanol, the liquid fuel A1 may be other liquid fuels such as ethanol, dimethyl ether, and a water solution that contains glucose.

The fuel cell of the present invention is usable suitably for portable electronic devices such as a mobile phone, an electronic camera, an electronic organizer, a notebook personal computers, a camcorder, a portable game machine, a portable video player, headphone stereos, and a PDA (Personal Digital Assistants), for example.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A liquid tank comprising:
a liquid container section storing liquid; and
a detector detecting volume of the liquid stored in the liquid container section, the detector including:
a first board having, on a front face thereof, a pair of detection electrodes for detecting a stray capacitance, the pair of detection electrodes directly or indirectly contacting with the liquid inside the liquid container section;
a second board having a shielding electrode and arranged on a back face side of the first board; and
a liquid pump drawing up the liquid stored inside the liquid container section,
wherein the detector includes, on a back side of the first and second boards, a printed board with a volume measurement circuit mounted thereon, the printed board being configured to measure the stray capacitance between the pair of detection electrodes, and
wherein the volume measurement circuit includes
a memory section storing an operation history of the liquid pump, and
a calculation section calculating, based on the operation history stored in the memory section, an amount of the liquid that has been drawn up, and calculate the volume of the liquid based on both the amount that has been drawn up and the stray capacitance.

2. The liquid tank according to claim 1, wherein
the liquid container section has a plurality of faces, and
the pair of detection electrodes occupies substantially the entire face of at least one of the plurality of faces of the liquid container section.

3. The liquid tank according to claim 1, wherein
the pair of detection electrodes has a shape of comb-tooth which are engaged with each other with a spacing therebetween.

4. The liquid tank according to claim 1, wherein the shielding electrode has a solid shape, a meshed shape, or a shape with slits.

5. The liquid tank according to claim 1, wherein:
an acceleration sensor configured to measure an attitude of the liquid container section relative to a vertical direction is attached to a face, of the liquid container section, on which the detector is provided; and
the volume measurement circuit calculates the volume of the liquid based on information on the attitude of the liquid container section, the information having been acquired from the acceleration sensor.

6. The liquid tank according to claim 1, wherein the liquid container section stores liquid fuel used for a fuel cell.

7. The liquid tank according to claim 1, wherein a protective layer is provided on the front face of the first board.

8. The liquid tank according to claim 7, wherein cosine of the contact angle of the liquid relative to the protective layer is negative.

9. The liquid tank according to claim 8, wherein the protective layer is configured of a thin resin film, or a coating layer.

10. A fuel cell with a fuel cell main body and a fuel cartridge which includes a liquid tank, the liquid tank comprising:
a liquid container section storing liquid; and
a detector detecting volume of the liquid stored in the liquid container section, the detector including:
a first board having, on a front face thereof, a pair of detection electrodes for detecting a stray capacitance, the pair of detection electrodes directly or indirectly contacting with the liquid inside the liquid container section;

a second board having a shielding electrode and arranged on a back face side of the first board; and a liquid pump drawing up the liquid stored inside the liquid container section, wherein the detector includes, on a back side of the first and second boards, a printed board with a volume measurement circuit mounted thereon, the printed board being configured to measure the stray capacitance between the pair of detection electrodes, and wherein the volume measurement circuit includes
- a memory section storing an operation history of the liquid pump, and
- a calculation section calculating, based on the operation history stored in the memory section, an amount of the liquid that has been drawn up, and calculate the volume of the liquid based on both the amount that has been drawn up and the stray capacitance.

* * * * *